United States Patent
Gaertner

[15] 3,699,194
[45] Oct. 17, 1972

[54] PROCESS FOR THE PRODUCTION OF DIMETHYL 1-METHYL-2-(METHYLCARBAMOYL) VINYL PHOSPHATE

[72] Inventor: George W. Gaertner, Modesto, Calif.
[73] Assignee: Shell Oil Company, New York, N.Y.
[22] Filed: Dec. 31, 1969
[21] Appl. No.: 889,705

[52] U.S. Cl..................................260/969, 260/943
[51] Int. Cl.................................................C07f 9/08
[58] Field of Search......................260/969, 943, 990

[56] References Cited

UNITED STATES PATENTS 3,288,889 11/1966 Szabo....................260/969 X
3,802,855 8/1957 Whetstone et al.....260/969 X
3,014,838 12/1961 Stiles et al..............260/969 X
3,053,877 9/1962 Birum et al................260/969
2,908,605 10/1959 Beriger et al..........260/943 X Primary Examiner—Lewis Gotts
Assistant Examiner—Richard L. Raymond
Attorney—Frank R. La Fontaine and Marion W. Western

[57] ABSTRACT

Improved production of dimethyl 1-methyl-2-(methylcarbamoyl)vinyl phosphate by the reaction of 2-chloro-N-methylacetoacetamide with trimethyl phosphite, results from conducting the reaction in the presence of a poly-halogenated lower alkane.

4 Claims, No Drawings

PROCESS FOR THE PRODUCTION OF DIMETHYL 1-METHYL-2-(METHYLCARBAMOYL) VINYL PHOSPHATE

BACKGROUND OF THE INVENTION

This invention is an improved process for the production of dimethyl 1-methyl-2-(methylcarbamoyl)vinyl phosphate, the active ingredient of an insecticide marketed commercially under the registered trademark Azodrin Insecticide.

DESCRIPTION OF THE PRIOR ART

Conventionally, dimethyl 1-methyl-2-(methylcarbamoyl)vinyl phosphate is prepared by the reaction of 2-chloro-N-methylacetoacetamide with trimethyl phosphite as described in U.S. Pat. No. 3,258,394. This reaction is shown by the equation:

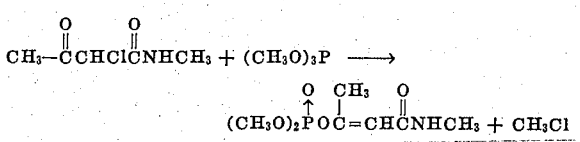

The reaction is carried out by adding the phosphite to the amide.

It has been disclosed in U.S. Pat. No. 2,802,855 that where the amide is a solid at ordinary temperatures, the use of an inert solvent such as xylene enables a fluid reaction system to be realized.

When the reaction of the phosphite with the amide is carried out in these conventional manners, both the alpha (structure I) and beta (structure II) isomers are produced. Since the beta isomer is not as insecticidally active as the alpha isomer, the elimination or at least minimization of the former would be advantageous.

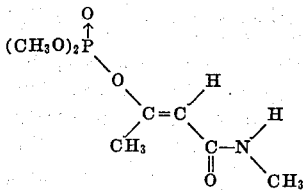

I. Alpha (α) Isomer
(Methyl group cis to the carbamoyl moiety)

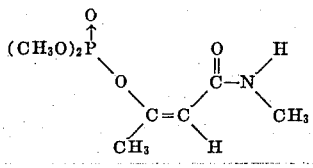

II. Beta (β) Isomer
(methyl group trans to the carbamoyl moiety)

SUMMARY OF THE INVENTION

This invention is an improved process for the production of dimethyl 1-methyl-2-(methylcarbamoyl)vinyl phosphate, which comprises reacting trimethyl phosphite with 2-chloro-N-methylacetoacetamide in the presence of a polyhalogenated lower alkane solvent wherein each halogen has an atomic number from 17 to 35.

It has been discovered that when the phosphite-amide reaction is carried out in the presence of one of these solvents, the purity, that is the percentage of the alpha isomer in the insecticidal product, increases. This means that the same degree of insecticidal activity can be obtained from a smaller amount of insecticide; thus, a higher quality insecticide is produced. Accompanying the purity increase is an improvement in yield which increases the quantity of the desired product obtained from the same amount of reactants, thus decreasing intermediate material consumption. When incorporated into the existing process, this invention enhances both the quality and quantity of the final product.

DESCRIPTION OF THE PREFERRED EMBODIMENTS

Generally polyhalogenated lower molecular weight alkanes are suitable for this invention, for example those containing up to five carbon atoms and boiling between about 0° C. and 120° C. Specific examples would be methylene chloride, chloroform, 1,1- and 1,2-dichloroethane, 1,1- and 1,2-dichloropropane, propyl bromide and the like. Of these, the polychlorinated methanes are preferred since they are inexpensive and readily available. Chloroform and methylene chloride are preferred. The process of this invention can be conveniently incorporated into the normal procedure for the production of the vinyl phosphate. The amide is a solid and the phosphite is a liquid at ambient temperatures, so for ease of handling, it is preferable to dissolve the amide in the solvent. Although the order of addition is not critical, it is advantageous to add the amide solution to the reaction vessel first to avoid the possibility of phosphite reacting with contaminants which may be present in the reaction vessel. The amide solution is added to a reaction vessel equipped with a stirrer, reflux condenser, addition facilities, a temperature indicator, and a heating-cooling system, the contents are brought to reaction temperature, and addition of the phosphite is then begun. Since the reaction is exothermic, the rate of mixing the reactants must be adjusted so the cooling capacity of the reaction vessel is not exceeded. Since the reaction is taking place in a solvent, the thermal effects are moderated. Upon completion of the addition of the second reactant, the reaction temperature is maintained until the reaction is completed. Although stoichiometrically only a 1:1 molar ratio of phosphite to amide is needed for the reaction, to push the reaction to completion it is advantageous to have an excess of phosphite. To avoid excessive recovery problems, it is best to have an excess of no more than 100 molar percent phosphite, with 20 to 50 molar percent being preferred. After the reaction is completed, the mass is cooled and the solvent and excess phosphite removed by distillation.

The temperature at which the process of the invention is carried out may range from as low as 20° C. or less up to 80° C. or more with the pressure being atmospheric or the pressure attained during the reaction in a refluxing system. However, super atmospheric pressure may be used to maintain the desired reaction temperature throughout the reaction. The preferred temperature range is about 55°–65° C.

Since for ease of handling the amide is dissolved in the solvent, it is convenient to relate the amount of solvent to the amide. The percentage of solvent incorporated to improve purity and yield may range as low as 25 percent by weight or less to as high as 75 percent by weight or more. Typically, however, the effective amount of solvent will be about 50 percent by weight of the amide solution.

The process of this reaction can also be incorporated into the procedure for the commercial production of the vinyl phosphate by converting the facilities to a continuous reaction system. Again, due to handling considerations, it is advantageous to dissolve the amide in the solvent. The phosphite and the amide solution would be added and mixed at a controlled rate with the temperature and pressure of the system being maintained at a level similar to those previously mentioned. In order to push the reaction to completion, it would be necessary to maintain a phosphite excess of no more than 100 molar percent, with a 20 to 50 molar percent phosphite being preferred. At the completion of the reaction the excess solvent and phosphite would be removed and final product collected in a suitable vessel.

The following examples show the preparation of dimethyl 1-methyl-2-(methylcarbamoyl)vinyl phosphate by batch and continuous methods.

EXAMPLE I

Batch Preparation of Dimethyl 1-methyl-2-(methylcarbamoyl)vinyl Phosphate without a Solvent Solid 2-chloro-N-methylacetoacetamide (amide) was charged to a reaction vessel equipped with a stirrer, reflux condenser, addition funnel and temperature indicator. The temperature was brought to 60° C. and held constant while enough trimethyl phosphite (TMP) was added over a 2-hour period to give TMP/amide mole ratio of 1.24. The reaction mixture was then held at 60° C. for additional 2.5 hours at the end of which time the reaction mass was cooled to room temperature. The reactor products were first stripped on a rotary evaporator at 75° C. and 1 Torr., then passed through a wiped-film evaporate (WFE) at 123° C. and 1 Torr. The bottoms product from each stripping was analyzed for dimethyl 1-methyl-2-(methylcarbamoyl)vinyl phosphate. Results showed an 82.7 percent $m$ yield based on the amide and 81.7 percent $w$ alpha isomer in the final WFE product. Table 1, Example I, summarizes the operating conditions and results.

EXAMPLE II

Batch Preparation of Dimethyl 1-methyl-2-(methylcarbamoyl)vinyl Phosphate in Chloroform Solution A 50 percent solution of the amide in chloroform was charged to the reaction vessel equipped as described in Example I. As on Example I, the temperature was held at 60° C. and the TMP was added over a 2-hour period to give a mole ratio of TMP/amide of 1.30:1. The reaction mass was then held for 6.5 hours at 60° C. to complete the reaction. The solvent was removed from the reaction products using the same equipment and conditions as Example I. The bottoms product from the evaporators was again analyzed for percent weight alpha isomer content. Results showed an 86.7 percent $m$ yield from the amide, 84.5 percent $w$ alpha isomer in the final product. Example II of Table I summarizes these results.

EXAMPLES III–IV

Several runs were made following the same procedure as Example II with the chloroform content varying from 25 to 75 percent $w$. Table I, Examples III and IV, summarizes the results.

TABLE I

| | Example No. | | | |
|---|---|---|---|---|
| | I | II | III | IV |
| Moles Amide Charged | 1.05 | 1.00 | 1.00 | 1.00 |
| Moles TMP/Moles Amide (charged) | 1.24 | 1.30 | 1.30 | 1.30 |
| CHCl$_3$ Dilution %w | 0 | 50 | 25 | 75 |
| TMP Addition Time—Hrs. | 2.0 | 2.0 | 2.0 | 2.0 |
| Temperature °C | 60 | 60 | 60 | 60 |
| Reaction Hold Time-Hrs. | 2.5 | 6.5 | 6.5 | 18.5 |
| Reaction Product Wt-grams | 286.4 | 419.2 | 313.0 | 739.3 |
| Reaction Product Residue %w of total reaction mixture | 90.2 | 58.9 | 80.4 | 33.6 |
| Product Purity, Off Rotary Evaporator, %w alpha isomer | 72.2 | 77.4 | 75.7 | 76.0 |
| Moles alpha + beta isomers produced | 0.836 | 0.857 | 0.854 | 0.846 |
| Moles Amide Reacted | 1.011 | .988 | .988 | .992 |
| Yield, %m from amide | 82.7 | 86.7 | 86.4 | 85.3 |
| Moles TMP Consumed/Moles Amide | 1.15 | 1.18 | 1.20 | 1.12 |
| Purity-WFE %w alpha isomer | 81.7 | 84.5 | 83.2 | 83.1 |

EXAMPLE V

Batch Preparation of Dimethyl 1-methyl-2-(methylcarbamoyl)vinyl Phosphate in Methylene Chloride The amide was added to methylene chloride in a reaction vessel equipped with a reflux condenser, temperature indicator and dropping funnel. TMP was added and the mixture was brought to reaction temperature. After holding the reaction temperature for the four hours, the reaction mass was allowed to cool to room temperature, the solvent was removed by a rotary evaporator, and the resulting product was analyzed. The results are summarized in Table II, Example V.

TABLE II

| | Example No. V |
|---|---|
| Moles Amide | 0.1 |
| Moles TMP/mole amide (charged) | 1.3 |
| Ml. solvent | 25 |
| Reaction temperature (°C) | 53 |
| Reaction time (Hrs.) | 4 |
| Yield-%w[1] | 103 |
| %w alpha isomer in product | 85 |
| Conversion of amide to alpha isomer—%m | 88 |

[1] Excess solvent, etc., was not removed completely giving overweight samples and thus higher yields.

EXAMPLE VI

Preparation of Dimethyl 1-methyl-2-(methylcarbamoyl)vinyl Phosphate in a 50 Percent Chloroform Solution. Four Stage Continuous System A four-stage continuous stirred tank reactor system is employed consisting of four reaction vessels, each equipped with a bottom drain valve, agitating equipment, condenser, overhead chloroform trap, temperature indicator, and heating and cooling equipment. The first reaction vessel was twice the capacity of each of the following three reactors. This particular design gave a residence time of about 7 hrs., which resulted in a mole percent conversion 'f the amide of more than 99 percent. The volume of each reactor was level-controlled during the reaction while the TMP and the amide/chloroform solution were metered in at a specific rate. The temperature of the reaction vessels was held to 63° C. throughout the course of the reaction. The reaction was run for about 35 hours to allow the system to approximate a steady rate; then the reaction system was blocked out for four hours. At the conclusion of this period reaction feed weights, overhead weights, and product weights were recorded and reactor samples taken. The results are summarized in Table III.

TABLE III

|  | EXAMPLE VII |
|---|---|
| Moles TMP/mole amide (charged) | 1.46 |
| Residence time (Hrs.) | 6.9 |
| Reaction temperature | 63°C |
| $CHCl_3$ Dilution %w | 50.6 |
| %m Amide Conversion | |
| Reactor 1 | 89.5 |
| Reactor 2 | 95.8 |
| Reactor 3 | 98.2 |
| Reactor 4 | 99.4 |
| %m Amide Selectivity to alpha and beta isomers | |
| Reactor 1 | 82.7 |
| Reactor 2 | 82.9 |
| Reactor 3 | 85.2 |
| Reactor 4 | 88.2 |
| Yield %m from amide | |
| Reactor 1 | 74.3 |
| Reactor 2 | 79.4 |
| Reactor 3 | 83.7 |
| Reactor 4 | 87.7 |
| TMP/Amide Molar Consumption | |
| Reactor 1 | 1.15 |
| Reactor 2 | 1.17 |
| Reactor 3 | 1.22 |
| Reactor 4 | 1.24 |
| PURITY (OFF WFE) %w alpha isomer | 84.9 |

The above experiments summarized in Table I indicate that a 50 percent w solution of 2-chloro-N-methylacetoacetamide in chloroform offers the greatest increase in the purity of the final product as well as the most improved yield. Increasing the percentage of chloroform to 75 percent does not offer any further advantage in either yield or purity.

As can be seen in Table III, running the reaction in the continuous system using a 50 percent chloroform-amide solution indicates a similar increase in purity and yield over the batch reaction run in the conventional manner.

I claim as my invention:

1. In the process for the production of dimethyl 1-methyl-2-(methylcarbamoyl)vinyl phosphate by the reaction of trimethyl phosphite with 2-chloro-N-methylacetoacetamide, the improvement which comprises reacting the trimethyl phosphite with 2-chloro-N-methylacetoacetamide in the presence of a polychlorinated methane solvent.

2. The improvement of claim 1 wherein the polychlorinated methane is methylene chloride.

3. The improvement of claim 1 wherein the polychlorinated methane is chloroform.

4. The improvement of claim 2 wherein the reaction is carried out in a continuous system.

* * * * *